United States Patent
Pihlaja et al.

(10) Patent No.: US 7,324,020 B2
(45) Date of Patent: *Jan. 29, 2008

(54) GENERAL PURPOSE INPUT BOARD FOR A TOUCH ACTUATION

(75) Inventors: Pekka Pihlaja, Helsinki (FI); Matti Ryynänen, Helsinki (FI)

(73) Assignee: Nokia Corporation

( * ) Notice: Subject to any disclaimer, the term of this patent is extended or adjusted under 35 U.S.C. 154(b) by 175 days.

This patent is subject to a terminal disclaimer.

(21) Appl. No.: 11/303,868

(22) Filed: Dec. 15, 2005

(65) Prior Publication Data

US 2006/0118610 A1 Jun. 8, 2006

Related U.S. Application Data

(63) Continuation-in-part of application No. 10/946,909, filed on Sep. 21, 2004, now Pat. No. 7,158,054.

(51) Int. Cl.
*G06K 9/00* (2006.01)
(52) U.S. Cl. ............ 341/22; 345/174; 200/42.02
(58) Field of Classification Search ............ 341/20, 341/22; 345/173, 174, 168; 178/102; 200/42.02
See application file for complete search history.

(56) References Cited

U.S. PATENT DOCUMENTS

| 5,374,449 A | 12/1994 | Buhlmann et al. ........... 427/100 |
| 5,774,566 A | 6/1998 | Huber et al. ................. 381/119 |
| 6,492,978 B1 | 12/2002 | Selig et al. .................. 345/173 |
| 6,636,203 B1 | 10/2003 | Wong et al. ................. 345/173 |
| 2003/0098854 A1 | 5/2003 | Laliberte et al. | |

*Primary Examiner*—Albert K. Wong

(57) ABSTRACT

The specification and drawings present a new method and apparatus for a touch actuation in an electronic device using a general purpose input board. The input board comprises of a grating of conductors running in one direction (y-lines). Between these conductors there are contacts connected to a grating running in the perpendicular direction a layer below (x-lines). The grating layers are separated by an insulating layer. Various known methods can be used to read the position of, e.g., a conductive actuator touching the input board. The input board can be used as a configurable UI board under a keymat. The input devices on the keymat can be a key, a joystick, a touchpad top membrane, etc. Also, the actuators can be made force-sensitive by detecting a contact surface area. In addition, all components of the general purpose input board can be made of materials substantially transparent to light.

39 Claims, 5 Drawing Sheets

GENERAL PURPOSE INPUT BOARD FOR A TOUCH ACTUATION

PRIORITY AND CROSS-REFERENCE TO RELATED APPLICATION

This application is a continuation in part of and claims priority from U.S. patent application Ser. No.: 10/946,909 filed on Sep. 21, 2004, now U.S. Pat. No. 7,158,054.

TECHNICAL FIELD

This invention generally relates to electronic touch-devices and more specifically to a touch actuation in an electronic device using a general purpose input board.

BACKGROUND ART

Presently, switchcovers of a given phone (e.g., a mobile phone) type mostly differ in their appearance whereas a number, positioning and a type of input devices is similar for most of the switchcovers due to construction of a UI (user interface) board. Typically, the input board contains contact pads at positions corresponding to keys on a keymat. Each pad is essentially the size of the corresponding key. As the key is depressed, its conductive lower surface short-circuits the two wires on the contact pad. The pad can also utilize capacitive or force sensing technology for detecting a keypress.

The reason for using metal or rubber domes as switches is that they give tactile feedback of a key activation to a user. It is also possible to use so called membrane switches, which are thin, but do not give tactile feedback. U.S. Pat. No. 5,374,449, "Monolithic Piezoelectric Structural Element for Keyboards and Method of Manufacturing", by A. Buhlmann et al. discloses how piezo-electric components can be used to replace membrane switches on a flat keyboard. EP Patent Application No. 1 197 835 A2 "User Interface Device", by A. R. Bick, published Apr. 17, 2002, discloses a keypad, where a capacitive matrix touch-device, capable of detecting the position of a finger, is disposed under the keypad comprising conventional switch keys.

Whichever switch type is used, a number of the keys and their positioning on conventional switchcovers are limited by the pads on the input board. Indeed, the choice of the input devices is limited to the keys only.

A free placement of the input devices could be implemented with so called smart covers. The problem is that the covers need to be wired, which makes them more complicated and expensive. Also, to ensure the stability of the phone, it is better to have all the electronics on the engine.

One possible way to vary the input device arrangement of switchcovers is to use so-called push-through keys, as disclosed in U.S. Pat. No. 6,492,978, "Keyscreen", by D. G. Selig et al.; US Patent Application No. 2003/0098854, "Integrated touchscreen and Keys in Same Matrix", by E. R. Laliberte, published May 29, 2003; and U.S. Pat. No. 6,636,203, "Keyboard Equivalent Pad Overlay Encasement for a Handheld Electronic Device", by Y. K. Wong et al. Here a touch-device is overlaid with a cover or with an unfolding flap equipped with keys. As the key is pressed (with a stylus or a finger) an actuator on its lower surface makes a contact with the touch-device thus providing a signal of a key activation. The key is identified by the detected contact position. Such push-through key is used in, e.g., the Sony-Ericsson P800 smart phone.

A resistive touch-device (e.g., a touch-screen) is sensitive to a touch of any actuator, but it can detect the position of only one contact at a time. Consequently, the keymat has to be supported above the touch-device, so that nothing touches a top membrane of the touch-device while the keys are in the up-position. This tends to result in a thick construction. If a capacitive touch-screen is used, the keymat can rest on a top of the touch-screen. However, the power consumption of a capacitive touch-device is higher.

Furthermore, there is a visual ergonomics problem associated with the present resistive touch-screens. They consist of two transparent resistive electrodes, one on the base substrate and the other on a film which is separated from the base substrate by an air-gap. The problem is that each air-material interface creates a light reflection which deteriorates image quality: the film adds two extra reflections. Another problem is that the accuracy of the resistive touch screens is determined by the linearity of resistance of the undersurface of the film. The material (usually Indium Tin Oxide, ITO) tends to develop cracks as the film is bent, especially at the edges of the touch screen, causing non-linearities in the resistance.

DISCLOSURE OF THE INVENTION

According to a first aspect of the invention, a method for providing an actuator identity signal using a general purpose input board, comprises the steps of: moving an actuator, by applying a manipulation signal to an actuator, to make a physical contact with the general purpose input board; and generating an actuator identity signal for providing the predetermined command, wherein the actuator identity signal is indicative of a location of the actuator on a surface of the general purpose input board and optionally indicative of a force imposed by the actuator on the general purpose input board and wherein the general purpose input board contains on the surface of the general purpose input board N conducting lines parallel to each other and electrically isolated from each other, and contains beneath the surface of the general purpose input board K further conducting lines parallel to each other and electrically isolated from each other and from the N conducting lines, the K further conducting lines being perpendicular to the N conducting lines, and wherein each of the K further conducting lines has N–1 contacts extending to the surface of the general purpose input board having one such contact of the N–1 contacts between any two of the N parallel conducting lines, wherein N and K are integers of at least a value of two.

According further to the first aspect of the invention, the manipulation signal may be applied by a user.

Further according to the first aspect of the invention, the actuator and the general purpose input board may be parts of an electronic device. Further, the electronic device may be a wireless portable device, a mobile communication device or a mobile phone. Still further, the manipulation signal may be applied by a user of the electronic device by a way of a mechanical touch using a stylus or a finger. Yet still further, the manipulation signal and the actuator identity signal may provide a predetermined command to the electronic device.

Still further according to the first aspect of the invention, the actuator may be made of a flexible conductive material and attached to an insulating cover, and the manipulation signal may be applied to the flexible conducting material of the actuator through the insulating cover.

According further to the first aspect of the invention, the N conducting lines may be equally spaced, the K conducting lines may be equally spaced and the N–1 contacts may also be equally spaced, wherein each of the N−1 contacts has an equal distance to any two adjacent parallel conducting lines out of the N conducting lines.

According still further to the first aspect of the invention, the actuator may be made of a conductive material and the actuator, when in the physical contact with the general purpose input board, may provide an electrical short between one or more conductive lines out of the N conductive lines to one or more further conductive lines out of the K further conductive lines. Still further, the location on the surface of the general purpose input board in a direction parallel to the N conducting lines may be determined by applying a different bias voltage to each of the K further conducting lines and by monitoring a voltage generated in any of the N conducting lines as a result of making the physical contact. Yet still further, the location on the surface of the general purpose input board in a further direction perpendicular to the N conducting lines may be determined by applying a different bias voltage to each of the N further conducting lines and monitoring a voltage generated in any of the K further conducting lines as a result of making the physical contact.

According further still to the first aspect of the invention, the actuator may be made of a conductive material and an electrically insulating membrane or a keymat may be laid over the surface of the general purpose input board, and the actuator, when in the physical contact with the general purpose input board, may provide a capacitive connection between one or more conductive lines out of the N conductive lines with one or more further conductive lines out of the K further conductive lines.

According yet further still to the first aspect of the invention, the actuation may be provided using a resistive method, a capacitive method, a digital switch method, an optical detection method or an inductive method.

Yet still further according to the first aspect of the invention, all components of the general purpose input board may be made of materials substantially transparent in a visible part of an optical spectrum. Further, the general purpose input board may be a transparent or translucent sensor-screen placed over a display in an electronic device, wherein the actuator can be situated to a position corresponding to an identified area of the display visible through the general purpose input board such that the actuator identity signal for providing the predetermined command may be generated when the actuator is moved to make a physical contact with the general purpose input board in the position corresponding to the identified area of the display. Still further, the actuator may be a stylus with at least a tip made of a flexible conductive material and the tip of the stylus, when in the physical contact with the general purpose input board, may provide an electrical short between one or more conductive lines out of the N conductive lines to one or more further conductive lines out of the K further conductive lines. Still yet further, the actuator may be a stylus made of a conductive material with a tip made of a flexible insulating material, and the tip of the stylus, when in the physical contact with the general purpose input board, may provide a capacitive connection between one or more conductive lines out of the N conductive lines with one or more further conductive lines out of the K further conductive lines.

According still yet further still to the first aspect of the invention, the general purpose input board may be covered by an electrically insulating material and the actuator may be a stylus with at least a tip made of a flexible conductive material and the tip of the stylus, when in the physical contact with the electrically insulating material, may provide a capacitive connection between one or more conductive lines out of the N conductive lines with one or more further conductive lines out of the K further conductive lines.

According to a second aspect of the invention, an electronic device for providing an actuator identity signal using a general purpose input board, comprises of: an actuator, responsive to a manipulation signal by a user of the electronic device for communicating a predetermined command to the electronic device; and a general purpose input board, responsive to a physical contact with the actuator, for generating an actuator identity signal used for providing the predetermined command, wherein the actuator identity signal is indicative of a location of the actuator on a surface of the general purpose input board and optionally indicative of a force imposed by the actuator on the general purpose input board and wherein the general purpose input board contains on the surface of the general purpose input board N conducting lines parallel to each other and electrically isolated from each other, and contains beneath the surface of the general purpose input board K further conducting lines parallel to each other and electrically isolated from each other and from the N conducting lines, the K further conducting lines being perpendicular to the N conducting lines, and wherein each of the K further conducting lines has N−1 contacts extending to the surface of the general purpose input board having one such contact of the N−1 contacts between any two of the N parallel conducting lines, wherein N and K are integers of at least a value of two.

Further according to the second aspect of the invention, all components of the general purpose input board may be made of materials substantially transparent in a visible part of an optical spectrum. Further, the general purpose input board may be a transparent or translucent sensor-screen placed over a display in an electronic device, wherein the actuator can be situated to a position corresponding to an identified area of the display visible through the general purpose input board such that the actuator identity signal for providing the predetermined command may be generated when the actuator is moved to make a physical contact with the general purpose input board in the position corresponding to the identified area of the display. Still further, the actuator may be a stylus with at least a tip made of a flexible conductive material and the tip of the stylus, when in the physical contact with the general purpose input board, may provide an electrical short between one or more conductive lines out of the N conductive lines to one or more further conductive lines out of the K further conductive lines. Yet still further, the actuator may be a stylus made of a conductive material with a tip made of a flexible insulating material, and the tip of the stylus, when in the physical contact with the general purpose input board, may provide a capacitive connection between one or more conductive lines out of the N conductive lines with one or more further conductive lines out of the K further conductive lines.

According yet further still to the second aspect of the invention, the general purpose input board may be covered by an electrically insulating material and the actuator may be a stylus with at least a tip made of a flexible conductive material and the tip of the stylus, when in the physical contact with the electrically insulating material, may provide a capacitive connection between one or more conductive lines out of the N conductive lines with one or more further conductive lines out of the K further conductive lines.

Yet still further according to the second aspect of the invention, the electronic device may be a wireless portable device, a mobile communication device or a mobile phone.

Still yet further according to the second aspect of the invention, the manipulation signal may be applied by a user of the electronic device, optionally by a way of a mechanical touch using a stylus or a finger.

According further to the second aspect of the invention, the actuator may be made of a flexible conductive material and attached to an insulating cover, and the manipulation signal may be applied to the flexible conducting material of the actuator through the insulating cover.

According still further to the second aspect of the invention, the N conducting lines may be equally spaced, the K conducting lines may be equally spaced and the N−1 contacts may also be equally spaced, wherein each of the N−1 contacts may have an equal distance to any two adjacent parallel conducting lines out of the N conducting lines.

According yet further still to the second aspect of the invention, the actuator may be made of a conductive material and the actuator, when in the physical contact with the general purpose input board, may provide an electrical short between one or more conductive lines out of the N conductive lines to one or more further conductive lines out of the K further conductive lines. Further, the location on the surface of the general purpose input board in a direction parallel to the N conducting lines may be determined by applying a different bias voltage to each of the K further conducting lines and by monitoring a voltage generated in any of the N conducting lines as a result of making the physical contact. Still further, the location on the surface of the general purpose input board in a direction perpendicular to the N conducting lines may be determined by applying a different bias voltage to each of the N further conducting lines and monitoring a voltage generated in any of the K further conducting lines may be a result of making the physical contact.

Yet still further according to the second aspect of the invention, the actuator may be made of a conductive material and an electrically insulating membrane or a keymat may be laid over the surface of the general purpose input board, and the actuator, when in the physical contact with the general purpose input board, may provide a capacitive connection between one or more conductive lines out of the N conductive lines with one or more further conductive lines out of the K further conductive lines.

Still yet further according to the second aspect of the invention, the actuation may be provided using a resistive method, a capacitive method, a digital switch method, an optical detection method or an inductive method.

According to a third aspect of the invention, a general purpose input board for providing an actuator identity signal, comprises of: N conducting lines on the surface of the general purpose input board, the N conducting lines being parallel to each other and electrically isolated from each other; and K further conducting lines beneath the surface of the general purpose input board, the K further conducting lines being parallel to each other and electrically isolated from each other and from the N conducting lines, the K further conducting lines being perpendicular to the N conducting lines, and each of the K further conducting lines has N−1 contacts extending to the surface of the general purpose input board having one such contact of the N−1 contacts between any two of the N parallel conducting lines, wherein N and K are integers of at least a value of two, wherein the actuator identity signal is indicative of a location of an actuator on a surface of the general purpose input board and optionally indicative of a force imposed by the actuator on the general purpose input board.

According further to the third aspect of the invention, the N conducting lines may be equally spaced, the K conducting lines are equally spaced and the N−1 contacts may also be equally spaced, wherein each of the N−1 contacts may have an equal distance to the any two adjacent parallel conducting lines out of the N conducting lines.

Further according to the third aspect of the invention, the actuator may be made of a conductive material and the actuator, when in the physical contact with the general purpose input board, may provide an electrical short between one or more conductive lines out of the N conductive lines to one or more further conductive lines out of the K further conductive lines. Still further, the location on the surface of the general purpose input board in a direction parallel to the N conducting lines may be determined by applying a different bias voltage to each of the K further conducting lines and by monitoring a voltage generated in any of the N conducting lines as a result of making the physical contact. Yet still further, the location on the surface of the general purpose input board in a further direction perpendicular to the N conducting lines may be determined by applying a different bias voltage to each of the N further conducting lines and monitoring a voltage generated in any of the K further conducting lines as a result of making the physical contact.

Still further according to the third aspect of the invention, the actuator may be made of a conductive material and an electrically insulating membrane or a keymat may be laid over the surface of the general purpose input board, and the actuator, when in the physical contact with the general purpose input board, may provide a capacitive connection between one or more conductive lines out of the N conductive lines with one or more further conductive lines out of the K further conductive lines.

According yet still further to the third aspect of the invention, all components of the general purpose input board may be made of materials substantially transparent in a visible part of an optical spectrum Benefits of using the general purpose input board for the touch activation may include (but may not be limited to):
  Passive switchcovers with different input device configurations can be used on one phone model;
  The same UI board can be used on different phone models;
  No need for wiring the switchcover and for electrical connections; the phone would just need a software setting/update to accept a switchcover with a new input device layout;
  Keys, an analogue joystick and a touchpad are possible to use for the key mechanism;
  Force-sensitive input devices are possible to use;
  A rubber dome and a metal dome can be used for the key mechanism;
  A touchpad implemented with the invention is insensitive to non-linearities of the top membrane resistance (e.g., when a membrane-like actuator is used);
  The input board could be produced as a flex of one fairly large size, then cut to a proper size to fit a particular phone model.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

A new apparatus and method are presented for a touch actuation in an electronic device (e.g., a wireless portable device, a mobile communication device, a mobile phone, etc.) using a general purpose input board.

According to an embodiment of the present invention, the general purpose input board (or alternatively called an input board) comprises of a grating of conductors running in one direction (y-lines). Between these conductors there are contacts connected to a grating running in the perpendicular direction a layer below (x-lines). The grating layers are separated by an insulating layer. The input board can be manufactured using a wide variety of technologies, e.g., printable resistive, conductive and insulating materials. Various known methods (discussed below) can be used to read the position of any, e.g., conductive actuator touching the input board. The input board can be used, e.g., as a configurable UI (user interface) board under a keymat. The input devices on the keymat can be of almost any type (a key, a joystick, a touchpad top membrane, etc.) and their configurations and positions can be freely varied on switchcovers. In addition, the actuators can be made force-sensitive by detecting a contact surface area.

There are many ways to implement the input board, including but not limited to:

Implementing conventionally on a printed wire board, as shown in FIG. 3 and discussed below;

Implementing on a flexible conductor; and

Figure 4:
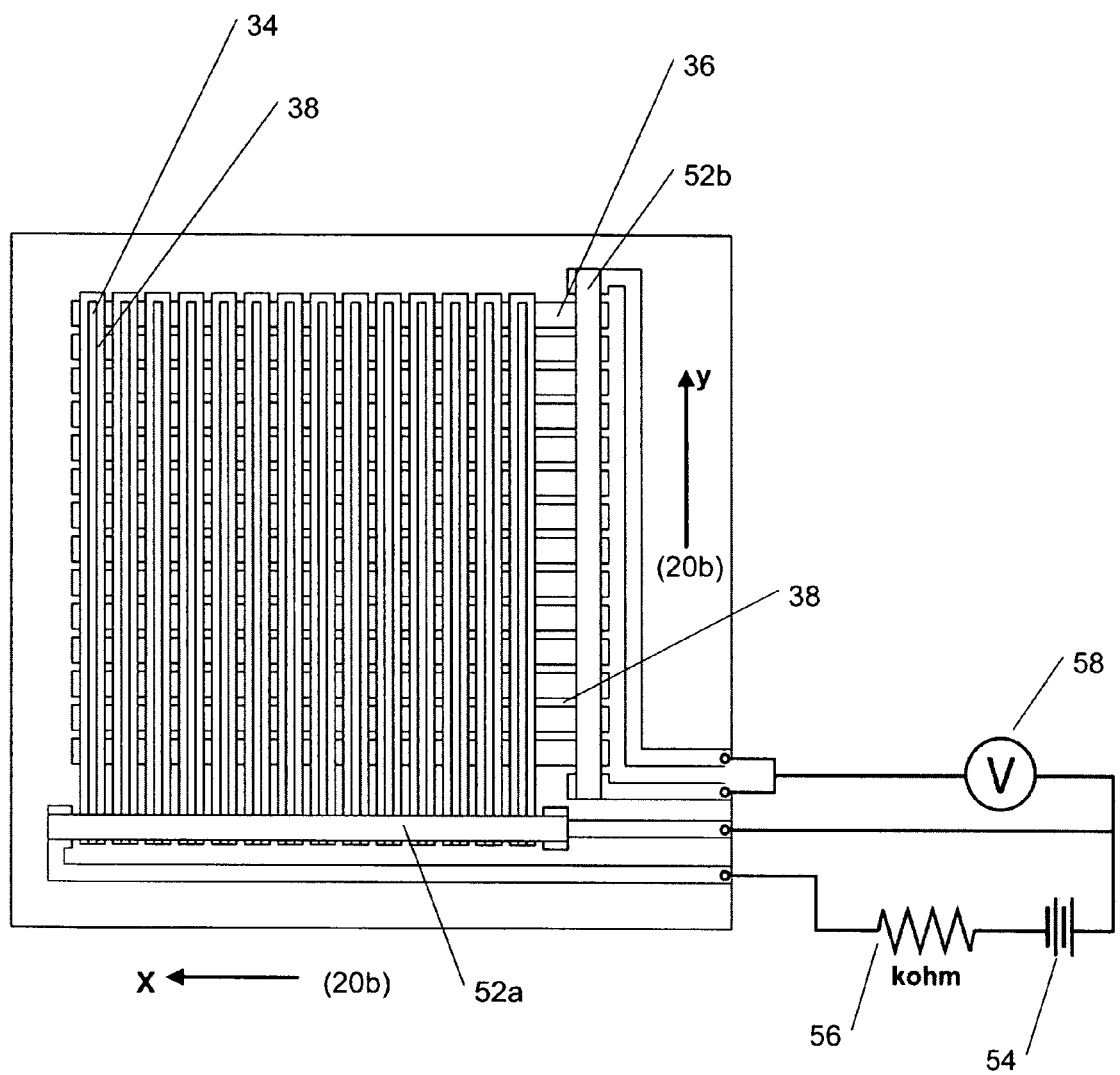
FIG. 4 is a schematic representation of a general purpose input board implemented as a printed input board, according to an embodiment of the present invention.

Implementing by printing with conductive, resistive and insulating materials as shown in FIG. 4 and discussed below.

Figure 1:
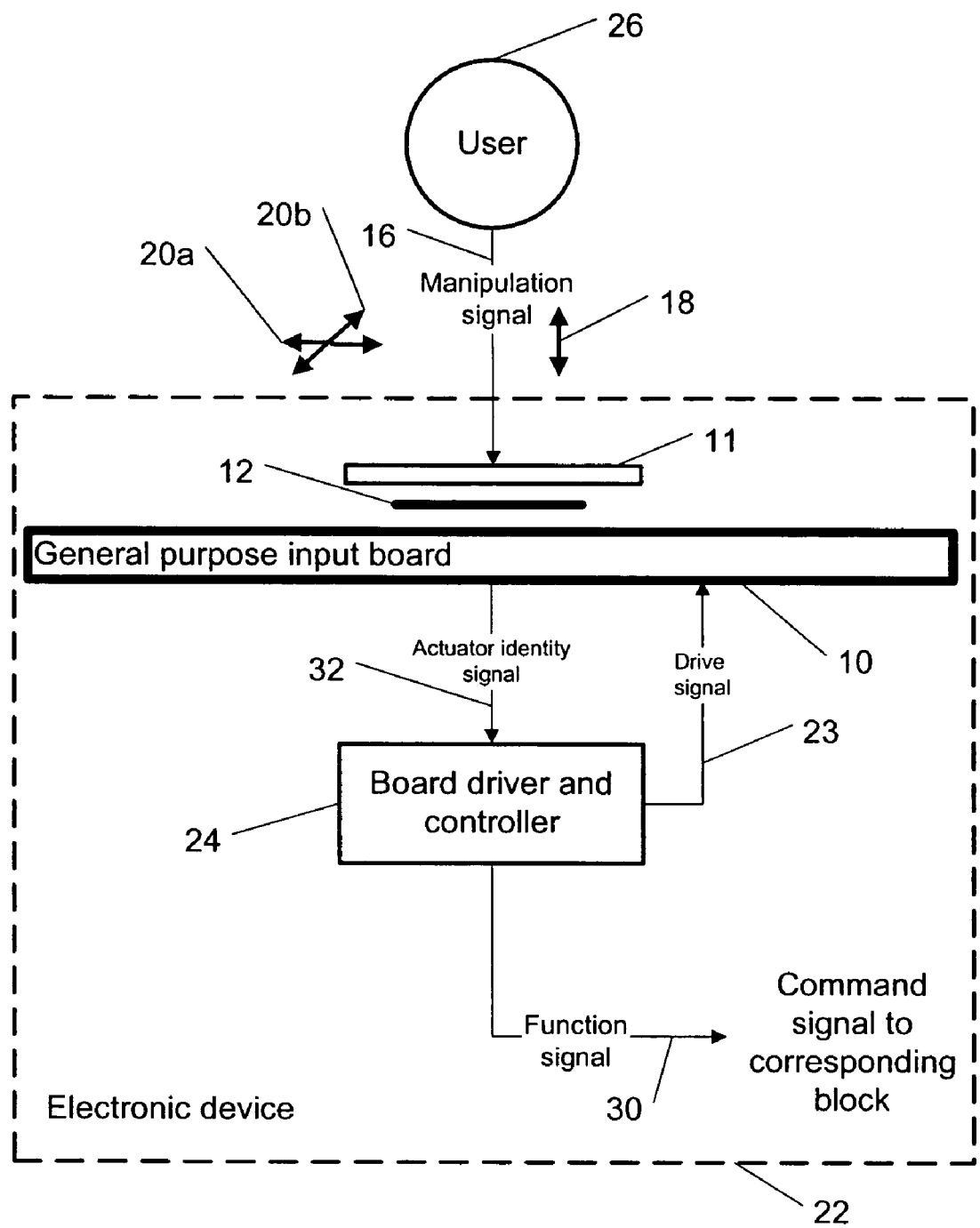
FIG. 1 is a block diagram of an electronic device having a general purpose input board for providing an actuator identity signal indicative of a location of said actuator on a surface of said general purpose input board and optionally indicative of a force imposed by said actuator on said general purpose input board, according to an embodiment of the present invention.

FIG. 1 shows a block diagram (representing one example among others) of an electronic device 22 having a general purpose input board 10 (or alternatively called an input board) for providing an actuator identity signal 32 indicative of a location of said actuator on a surface of the input board 10 and optionally indicative of a force imposed by said actuator on the input board 10, according to an embodiment of the present invention.

A manipulation signal 16 is applied to an actuator 12 of the electronic device 22 by a user 26 to communicate a predetermined command to the electronic device 22. The manipulation signal 16 can be, e.g., a mechanical touch of the user 26 using a stylus or a finger. According to an embodiment of the present invention, the actuator 12 can be made of a flexible conductive material attached to an insulating cover 11 such, that the manipulation signal 16 is applied to the flexible conducting material of the actuator 12 through the insulating cover 11. The actuator 12, having a "flexible" connection with a cover of the electronic device 22 can move in a direction 18 perpendicular to the surface of the input board 10 and possibly can move in a plane parallel (e.g., directions 20a and 20b) to a surface of the input board 10 of the electronic device 22 within a predetermined area of the input board 10 using said manipulation signal 16.

If the actuator 12 makes a physical contact with the input board 10, an actuator identity signal 32 is generated by the input board 10 for providing said predetermined command. This actuator identity signal 32 is indicative of a location of the actuator 12 in said plane and optionally indicative of a force imposed by said actuator 12 on the input board 10, thus providing a multi-functional touch actuation. The actuator identity signal 32 is provided to a board driver and controller 24 (which provides the input board 10 with a drive signal 23). The board driver and controller 24 generates a function signal 30 providing it as the predetermined command to a corresponding block of the electronic device 22.

Figure 2:
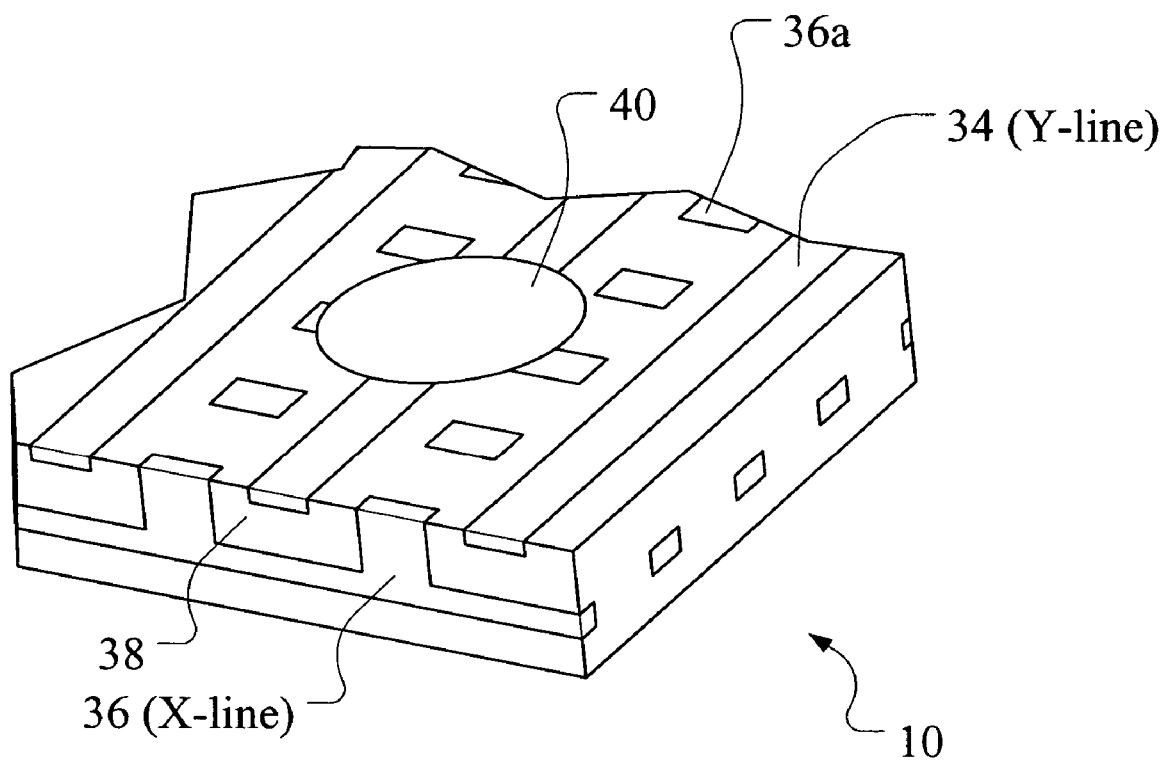
FIG. 2 is a perspective view of a general purpose input board, according to an embodiment of the present invention.

FIG. 2 is an example among others of a perspective view of a general purpose input board 10 demonstrating a principle of operation of the input board 10, according to an embodiment of the present invention. The surface of the input board 10 contains a grating of conductors running in the y-direction forming y-lines 34. For example, y-lines 34 can contain N (N is an integer of at least a value of two) conducting lines on the surface of the input board 10, wherein said N conducting lines are parallel to each other and electrically isolated (using an insulating material 38) from each other. There are contacts connected to x-lines 36 running in the insulated layer below between the y-lines 34. For example, x-lines 36 can contain K (K is an integer of at least a value of two) further conducting lines beneath the surface of the input board 10, wherein said K further conducting lines are parallel to each other and electrically isolated (using the insulating material 38) from each other and from said N conducting lines 34. Also, said K further conducting lines 36 are perpendicular to said N conducting lines 34, and each of said K further conducting lines has N−1 contacts 36a extending to the surface of the input board 10 having one such contact of said N−1 contacts 36a between any two of said N parallel conducting lines.

In one possible implementation of the present invention, said N conducting lines 34 are equally spaced, said K conducting lines 36 are equally spaced and said N−1 contacts 36a are also equally spaced and wherein each of said N−1 contacts 36a has an equal distance to said any two adjacent parallel conducting lines out of said N conducting lines 34.

According to a further embodiment of the present invention, when the actuator 12 is made of a conductive material and, if in the physical contact (with an area of a contact 40) with the input board 10, said actuator 12 provides an electrical short between one or more conductive lines out of said N conductive lines 34 to one or more further conductive lines out of said K further conductive lines 36. Furthermore, according to an embodiment the present invention, when the actuator 12 is made of a conductive material and an electrically insulating membrane is laid over a surface of the input board 10, and, if in the physical contact with said general purpose input board, the actuator 12 provides a capacitive connection between one or more conductive lines out of said N conductive lines 34 to one or more further conductive lines out of said K further conductive lines 36.

The basic idea of the present invention is to detect the x-position and the y-position of the actuator 12 touching the input board 10. The actuator may be an undersurface of an input device on a keymat. Examples of such input devices among many possible alternatives are depicted in FIGS. 3a and 3b.

Figure 3A:
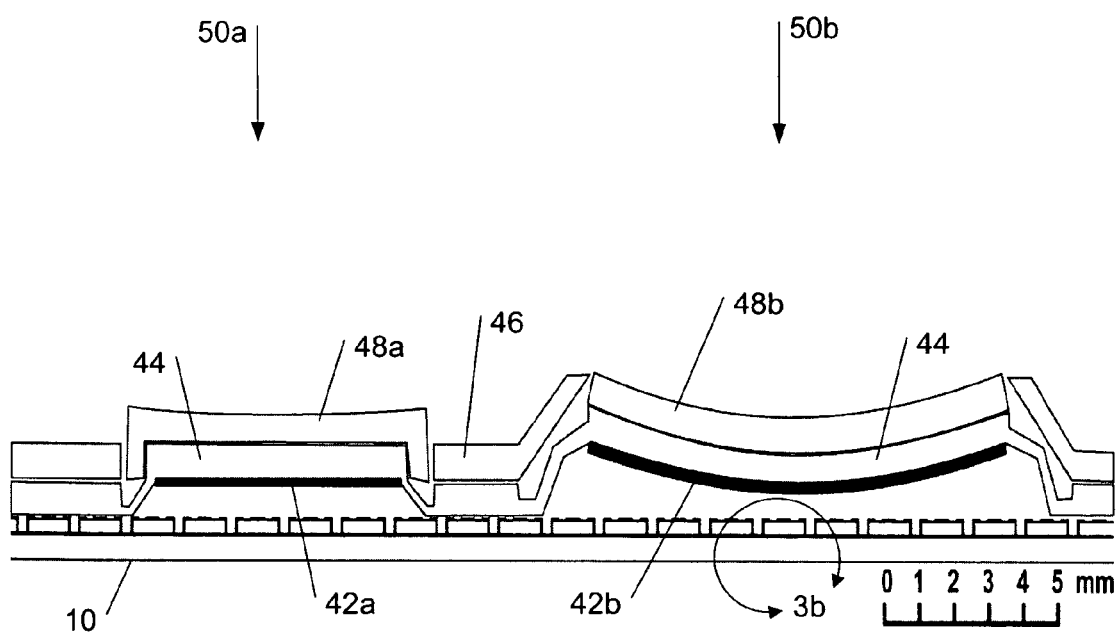
FIG. 3a is a cross-sectional view of a general purpose input board with an actuator utilizing a key (on the left) or joystick (on the right) as an input device, according to an embodiment of the present invention.
Figure 3B:
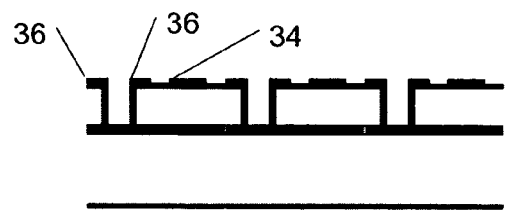
FIG. 3b is a cross-sectional view of a general purpose input board taken along 3b line in FIG. 3a, according to an embodiment of the present invention.

FIG. 3a shows one example among others of a cross-sectional view of the general purpose input board 10 with an actuator utilizing a key 50a (generally indicated on the left) or joystick 50b (generally indicated on the right) as an input device, according to an embodiment of the present invention. FIG. 3b is a cross-sectional view of the general purpose input board taken along 3b line in FIG. 3a.

The actuator is implemented as a conductive rubber 42 and 42b (for the key 50a and the joystick 50b implementations, respectively). The actuator is undersurface of an input device on a keymat 44 followed by key-caps 48a and 48b, again, for the key 50a and the joystick 50b implementations, respectively (the manipulation signal 18 is applied by the user 26 to the key-caps 48a and/or 48b). Cover 46 is for protecting the keymat 44.

A touchpad can be implemented simply by topping the input board 10 with a membrane having a conductive undersurface (e.g., using a membrane-like actuator). The membrane then would be separated from the input board 10 with an air-gap. The benefit of using the input board 10 to implement a touchpad is that the undersurface of the top membrane can be fully conductive. In fact, the resistance value of the top membrane is rather immaterial, as the current's path is very short (e.g., about 0.2 mm). Consequently, the touch-device using the general purpose input board 10 described by the present invention is insensitive to non-linearities of the top membrane resistance. In addition, stretching of the membrane does not affect pointing accuracy.

FIG. 4 shows one example among others of a schematic representation of the general purpose input board 10 implemented as a printed input board, according to an embodiment of the present invention, using a conductive print (for implementing the y- and x-lines 34 and 36, respectively), an insulating print (for providing the insulating material 38) and a resistive print (see elements 52a and 52b). Distributed resistors 52a and 52b are used for applying different voltages to the y- and x- lines 34 and 36, respectively, by voltage division.

The location on the surface of the general purpose input board 10 in a direction 20b parallel to said N conducting lines is determined by applying a different bias voltage (e.g., using a battery 54, a resistor 56 and a distributed resistor 52a) to each of said K further conducting lines and by monitoring a voltage (e.g., using a voltmeter 58) generated in any of the N conducting lines 34 as a result of making said physical contact.

Similarly, the location on the surface of the general purpose input board 10 in a further direction 20a perpendicular to said N conducting lines is determined by applying a different bias voltage (e.g., using the battery 54, the resistor 56 and the distributed resistor 52b) to each of said N further conducting lines and monitoring a voltage (e.g., using the voltmeter 58) generated in any of the K further conducting lines 36 as a result of making said physical contact.

The contact the actuator makes with the x- and y-lines can be conductive or capacitive.

As can be seen in FIG. 3, depressing an actuator would short-circuit one or several x-lines 36 conductively to one or several y-lines 34. The position of the contact can be detected, e.g., by a simple resistive circuit, as described above in regard to FIG. 4. Though the conductive contact method is a simple method with low power consumption, it requires that the contacts on the input board 10 are exposed while the actuator 12 is being switched, therefore ESD protection is needed. It is noted that the conductive contact method is ideal when products for different product categories are created on the same phone engine (e.g., phone engine), but there is no need for user changeable switch-covers.

If the depressed actuator 12 makes a capacitive contact with the x- and y-lines 36 and 34, there is no need for exposed contacts on the surface of the input board 10. Though the capacitive method solves all the problems associated with the conductive contact method, it has higher power consumption.

Other detection methods may include (but are not limited to):
digital switch matrix;
optical detection (the actuator can transmit light into the x- and y-lines, or from the x-lines to the y-lines);
inductive detection (magnets on the actuators induce currents on the x-lines and the y-lines).

According to a further embodiment of the present invention, all components of the general purpose input board (see FIG. 2) can be made of materials substantially transparent in a visible part of the optical spectrum. This creates further opportunities as described below.

Figure 5:
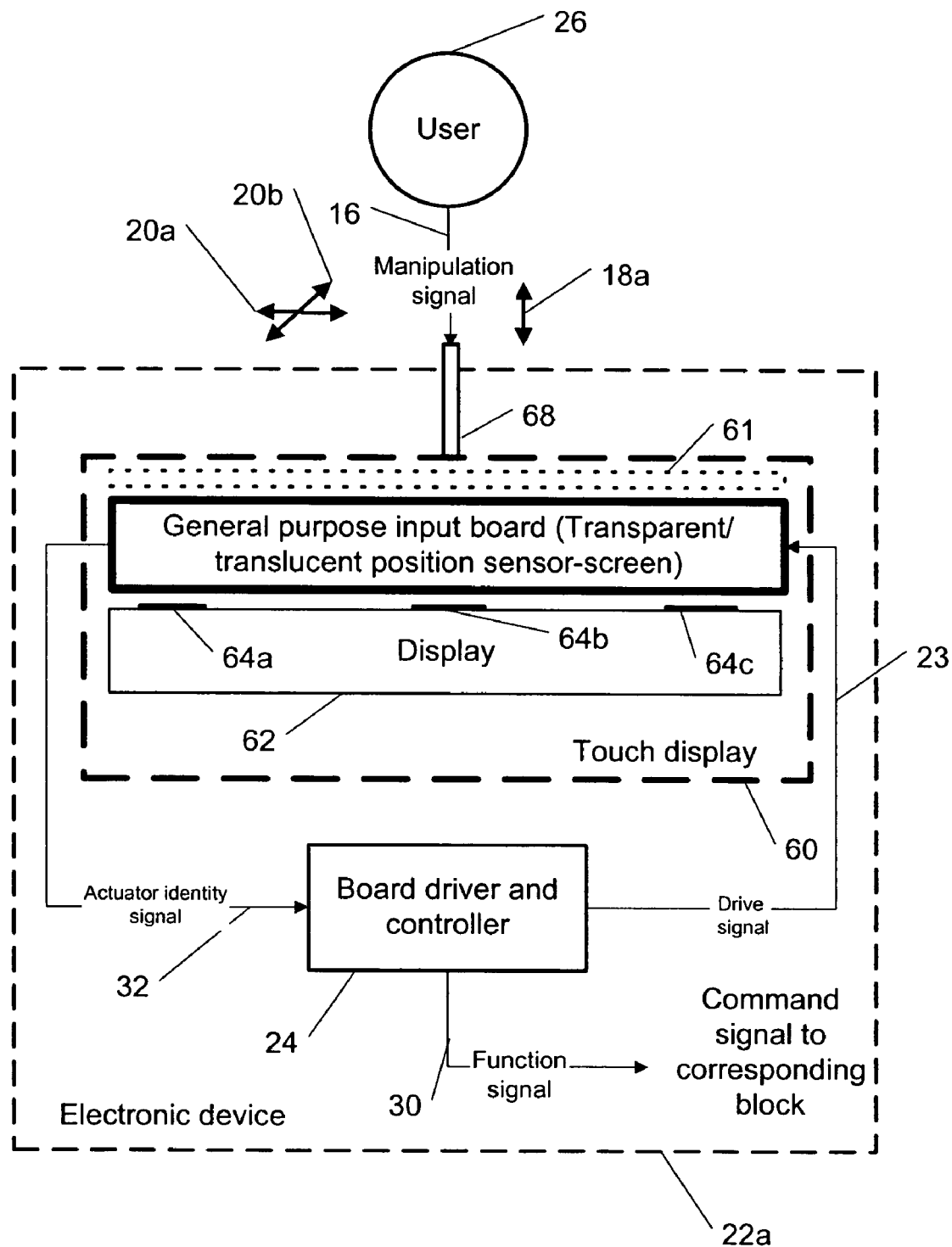
FIG. 5 is a block diagram of an electronic device having a transparent general purpose input board as a part of a touch display, according to an embodiment of the present invention.

FIG. 5 shows an example among others of a block diagram of an electronic device 22a having a transparent general purpose input board 10 as a part of a touch display 60, according to an embodiment of the present invention. In the example shown in FIG. 2, the transparent general purpose input board 10a has a function of a transparent/translucent position sensor-screen placed over a display 62. The elements 64a, 64b and 64c (e.g., appropriate keys) drawn on the display 62 are visible to the user 26 through a transparent board 10a. If the user 26 want to activate any of these keys 64a, 64b or 64c, the user 26 can touch (by making a physical contact with) any of these keys using a stylus 68 acting as an actuator, thus generating the actuator identity signal 32 for providing the predetermined command (the function signal 30) as described in reference to FIG. 1. Other blocks and signals shown in FIG. 6 are the same as in FIG. 1 discussed above.

Moreover, according to an embodiment of the present invention, the stylus 68 can be made of a conductive material or at least have a tip made of a flexible conductive material and this tip, when in the physical contact with the general purpose input board 10a, provides an electrical short between one or more conductive lines out of the N conductive lines to one or more further conductive lines out of the K further conductive lines (as shown in FIG. 2).

Furthermore, according to another embodiment of the present invention, the stylus 68 can be made of a conductive material with a tip made of a flexible insulating material, and said tip, when in the physical contact with said general purpose input board 10a, provides a capacitive connection between one or more conductive lines out of the N conductive lines with one or more further conductive lines out of the K further conductive lines of the board 10a (as shown in FIG. 2). It is noted that, according to an embodiment wherein the general purpose input board 10a or 10, both "transparent" and "non-transparent" (as described above) can be covered by an electrically insulating material 61 (as shown in FIG. 5) and the actuator can be made of the conductive material or at least have a tip made of a flexible conductive material and the tip of the stylus, when in the physical contact with the said electrically insulating material 61 covering the general purpose input board 10a (or 10, in general), provides a capacitive connection between one or more conductive lines out of said N conductive lines with one or more further conductive lines out of said K further conductive lines. The cover of the electrically insulating material 61 can also help to add durability, reduce light reflection, avoid contamination and provide an appropriate friction coefficient for an appropriate operation of the general purpose input board 10a or 10.

As discussed above, various known methods can be used to read the position of an actuator touching the transparent input board 10a. In that regard, another possible application of the transparent input board 10a can be drawing a picture on the display 62.

Also it is noted that, according to embodiments of the present invention, the conducting lines (e.g., 34 and 36 in FIG. 2) don't have to: a) be exactly parallel, b) have equal distance from each other and, or c) be straight lines. However, the conducting lines 34 and 36 have to be concatenated to the resistors 52a and 52b, respectively, as shown in FIG. 4.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   moving an actuator, by applying a manipulation signal to an actuator, to make a physical contact with a general purpose input board; and
   generating an actuator identity signal for providing a predetermined command, wherein said actuator identity signal is indicative of at least one of: a location of said actuator on a surface of said general purpose input board and of a force imposed by said actuator on said general purpose input board, and wherein said general purpose input board contains on the surface of said general purpose input board N conducting lines parallel to each other and electrically isolated from each other, and contains beneath the surface of said general purpose input board K further conducting lines parallel to each other and electrically isolated from each other and from said N conducting lines, said K further conducting lines being perpendicular to said N conducting lines, and wherein each of said K further conducting lines has N–1 contacts extending to the surface of said general purpose input board having one such contact of said N–1 contacts between any two of said N parallel conducting lines, wherein N and K are integers of at least a value of two.

2. The method of claim 1, wherein said manipulation signal is applied manually.

3. The method of claim 1, wherein said actuator and said general purpose input board are parts of an electronic device.

4. The method of claim 3, wherein said manipulation signal is applied by a way of a mechanical touch using a stylus or a finger.

5. The method of claim 3, wherein said manipulation signal and said actuator identity signal are for providing a predetermined command to said electronic device.

6. The method of claim 1, wherein said actuator is made of a flexible conductive material and attached to an insulating cover, and said manipulation signal is applied to said flexible conducting material of said actuator through said insulating cover.

7. The method of claim 1, wherein said N conducting lines are equally spaced, said K conducting lines are equally spaced and said N–1 contacts are also equally spaced, wherein each of said N–1 contacts has an equal distance to said any two adjacent parallel conducting lines out of said N conducting lines.

8. The method of claim 1, wherein said actuator is made of a conductive material and said actuator, when in the physical contact with said general purpose input board, configured to provide an electrical short between one or more conductive lines out of said N conductive lines to one or more further conductive lines out of said K further conductive lines.

9. The method of claim 8, wherein said location on the surface of said general purpose input board in a direction parallel to said N conducting lines is determined by applying a different bias voltage to each of said K further conducting lines and by monitoring a voltage generated in any of the N conducting lines as a result of making said physical contact.

10. The method of claim 8, wherein said location on the surface of said general purpose input board in a further direction perpendicular to said N conducting lines is determined by applying a different bias voltage to each of said N further conducting lines and monitoring a voltage generated in any of the K further conducting lines as a result of making said physical contact.

11. The method of claim 1, wherein said actuator is made of a conductive material and an electrically insulating membrane or a keymat is laid over said surface of said general purpose input board, and said actuator, when in the physical contact with said general purpose input board, is configured to provide a capacitive connection between one or more conductive lines out of said N conductive lines with one or more further conductive lines out of said K further conductive lines.

12. The method of claim 1, wherein said actuator identity signal is provided using a resistive method, a capacitive method, a digital switch method, an optical detection method or an inductive method.

13. The method of claim 1, wherein all components of the general purpose input board are made of materials substantially transparent in a visible part of an optical spectrum.

14. The method of claim 13, wherein said general purpose input board is a transparent or translucent sensor-screen placed over a display in an electronic device, wherein the actuator is configured to be situated to a position corresponding to an identified area of the display visible through the general purpose input board such that said actuator identity signal for providing said predetermined command is generated when the actuator is moved to make a physical contact with the general purpose input board in said position corresponding to the identified area of the display.

15. The method of claim 13, wherein said actuator is a stylus with at least a tip made of a flexible conductive material and said tip of the stylus, when in the physical contact with said general purpose input board, is configured to provide an electrical short between one or more conductive lines out of said N conductive lines to one or more further conductive lines out of said K further conductive lines.

16. The method of claim 13, wherein said actuator is a stylus made of a conductive material with a tip made of a flexible insulating material, and said tip of the stylus, when in the physical contact with said general purpose input board, is configured to provide a capacitive connection between one or more conductive lines out of said N conductive lines with one or more further conductive lines out of said K further conductive lines.

17. The method of claim 13, wherein said general purpose input board is covered by an electrically insulating material and said actuator is a stylus with at least a tip made of a flexible conductive material and said tip of the stylus, when in the physical contact with said electrically insulating material, is configured to provide a capacitive connection between one or more conductive lines out of said N conductive lines with one or more further conductive lines out of said K further conductive lines.

18. An electronic device, comprising:
an actuator, responsive to a manipulation signal for communicating a predetermined command to said electronic device; and
a general purpose input board, responsive to a physical contact with said actuator, configured to generate an actuator identity signal used for providing said predetermined command,
wherein said actuator identity signal is indicative of at least one of: a location of said actuator on a surface of said general purpose input board and of a force imposed by said actuator on said general purpose input board, and wherein said general purpose input board contains on the surface of said general purpose input board N conducting lines parallel to each other and electrically isolated from each other, and contains beneath the surface of said general purpose input board K further conducting lines parallel to each other and electrically isolated from each other and from said N conducting lines, said K further conducting lines being perpendicular to said N conducting lines, and wherein each of said K further conducting lines has N−1 contacts extending to the surface of said general purpose input board having one such contact of said N−1 contacts between any two of said N parallel conducting lines, wherein N and K are integers of at least a value of two.

19. The electronic device of claim 18, wherein all components of the general purpose input board are made of materials substantially transparent in a visible part of an optical spectrum.

20. The electronic device of claim 19, wherein said general purpose input board is a transparent or translucent sensor-screen placed over a display in an electronic device, wherein the actuator is configured to be situated to a position corresponding to an identified area of the display visible through the general purpose input board such that said actuator identity signal for providing said predetermined command is generated when the actuator is moved to make a physical contact with the general purpose input board in said position corresponding to the identified area of the display.

21. The electronic device of claim 19, wherein said actuator is a stylus with at least a tip made of a flexible conductive material and said tip of the stylus, when in the physical contact with said general purpose input board, is configured to provide an electrical short between one or more conductive lines out of said N conductive lines to one or more further conductive lines out of said K further conductive lines.

22. The electronic device of claim 19, wherein said actuator is a stylus made of a conductive material with a tip made of a flexible insulating material, and said tip of the stylus, when in the physical contact with said general purpose input board, is configured to provide a capacitive connection between one or more conductive lines out of said N conductive lines with one or more further conductive lines out of said K further conductive lines.

23. The electronic device of claim 18, wherein said general purpose input board is covered by an electrically insulating material and said actuator is a stylus with at least a tip made of a flexible conductive material and said tip of the stylus, when in the physical contact with said electrically insulating material, is configured to provide a capacitive connection between one or more conductive lines out of said N conductive lines with one or more further conductive lines out of said K further conductive lines.

24. The electronic device of claim 18, wherein said electronic device is for wireless communications.

25. The electronic device of claim 18, wherein the manipulation signal is applied by a way of a mechanical touch using a stylus or a finger.

26. The electronic device of claim 18, wherein said actuator is made of a flexible conductive material and attached to an insulating cover, and said manipulation signal is applied to said flexible conducting material of said actuator through said insulating cover.

27. The electronic device of claim 18, wherein said N conducting lines are equally spaced, said K conducting lines are equally spaced and said N−1 contacts are also equally spaced, wherein each of said N−1 contacts has an equal distance to said any two adjacent parallel conducting lines out of said N conducting lines.

28. The electronic device of claim 18, wherein said actuator is made of a conductive material and said actuator, when in the physical contact with said general purpose input board, is configured to provide an electrical short between one or more conductive lines out of said N conductive lines to one or more further conductive lines out of said K further conductive lines.

29. The electronic device of claim 28, wherein said location on the surface of said general purpose input board in a direction parallel to said N conducting lines is determined by applying a different bias voltage to each of said K further conducting lines and by monitoring a voltage generated in any of the N conducting lines as a result of making said physical contact.

30. The electronic device of claim 28, wherein said location on the surface of said general purpose input board in a direction perpendicular to said N conducting lines is determined by applying a different bias voltage to each of said N further conducting lines and monitoring a voltage generated in any of the K further conducting lines as a result of making said physical contact.

31. The electronic device of claim 18, wherein said actuator is made of a conductive material and an electrically insulating membrane or a keymat is laid over said surface of said general purpose input board, and said actuator, when in the physical contact with said general purpose input board, is configured to provide a capacitive connection between one or more conductive lines out of said N conductive lines with one or more further conductive lines out of said K further conductive lines.

32. The electronic device of claim 18, wherein said actuator identity signal is provided using a resistive method, a capacitive method, a digital switch method, an optical detection method or an inductive method.

33. A general purpose input board, comprising:
- N conducting lines on the surface of said general purpose input board, said N conducting lines being parallel to each other and electrically isolated from each other;
- K further conducting lines beneath the surface of said general purpose input board, said K further conducting lines being parallel to each other and electrically isolated from each other and from said N conducting lines, said K further conducting lines being perpendicular to said N conducting lines, and each of said K further conducting lines has N−1 contacts extending to the surface of said general purpose input board having one such contact of said N−1 contacts between any two of said N parallel conducting lines, wherein N and K are integers of at least a value of two; and
- a controller, configured to generate a drive signal for said N conducting lines and for said K further conducting lines, and configured to generate an actuator identity signal indicative of at least one of: a location of an actuator on a surface of said general purpose input board and of a force imposed by said actuator on said general purpose input board.

34. The general purpose input board of claim 33, wherein said N conducting lines are equally spaced, said K conducting lines are equally spaced and said N−1 contacts are also equally spaced, wherein each of said N−1 contacts has an equal distance to said any two adjacent parallel conducting lines out of said N conducting lines.

35. The general purpose input board of claim 33, wherein said actuator is made of a conductive material and said actuator, when in the physical contact with said general purpose input board, is configured to provide an electrical short between one or more conductive lines out of said N conductive lines to one or more further conductive lines out of said K further conductive lines.

36. The general purpose input board of claim 35, wherein said location on the surface of said general purpose input board in a direction parallel to said N conducting lines is determined by applying a different bias voltage to each of said K further conducting lines and by monitoring a voltage generated in any of the N conducting lines as a result of making said physical contact.

37. The general purpose input board of claim 35, wherein said location on the surface of said general purpose input board in a further direction perpendicular to said N conducting lines is determined by applying a different bias voltage to each of said N further conducting lines and monitoring a voltage generated in any of the K further conducting lines as a result of making said physical contact.

38. The general purpose input board of claim 33, wherein said actuator is made of a conductive material and an electrically insulating membrane or a keymat is laid over said surface of said general purpose input board, and said actuator, when in the physical contact with said general purpose input board, is configured to provide a capacitive connection between one or more conductive lines out of said N conductive lines with one or more further conductive lines out of said K further conductive lines.

39. The general purpose input board of claim 33, wherein all components of the general purpose input board are made of materials substantially transparent in a visible part of an optical spectrum.

\* \* \* \* \*

UNITED STATES PATENT AND TRADEMARK OFFICE
CERTIFICATE OF CORRECTION

PATENT NO.        : 7,324,020 B2                                            Page 1 of 1
APPLICATION NO.   : 11/303868
DATED             : January 29, 2008
INVENTOR(S)       : Pekka Pihlaja and Matti Ryynänen It is certified that error appears in the above-identified patent and that said Letters Patent is hereby corrected as shown below:

In column 12, line 17, which is claim 8, line 3, after "board," -- is -- should be inserted.

Signed and Sealed this

Eighteenth Day of November, 2008

JON W. DUDAS
*Director of the United States Patent and Trademark Office*